(12) United States Patent
Duffy et al.

(10) Patent No.: US 6,470,849 B1
(45) Date of Patent: Oct. 29, 2002

(54) SEPARATE INJECTOR MAIN TIMING MAPS FOR USE WITH AND WITHOUT PILOT

(75) Inventors: Kevin P. Duffy, East Peoria, IL (US); Brian G. McGee, Chillicothe, IL (US); Matthew R. Roth, Metamora, IL (US); Jason J. Rasmussen, Edwards, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/888,585

(22) Filed: Jun. 26, 2001

(51) Int. Cl.$^7$ .......................... F02M 37/04; F02D 41/40
(52) U.S. Cl. ..................... 123/299; 123/300; 123/501; 123/305
(58) Field of Search .............................. 123/299, 300, 123/500, 501, 446

(56) References Cited

U.S. PATENT DOCUMENTS

| | | | |
|---|---|---|---|
| 4,368,705 A | | 1/1983 | Stevenson et al. |
| 5,482,016 A | | 1/1996 | Ohishi et al. |
| 5,884,602 A | | 3/1999 | Friedrich et al. |
| 5,890,467 A | * | 4/1999 | Romzek ..................... 123/299 |
| 5,970,950 A | | 10/1999 | Shimizu et al. |
| 6,032,642 A | * | 3/2000 | Trumbower ................. 123/299 |
| 6,062,193 A | | 5/2000 | Gatellier |
| 6,082,331 A | * | 7/2000 | Barnes ....................... 123/446 |
| 6,164,264 A | * | 12/2000 | Thomas ...................... 123/300 |
| 6,305,348 B1 | * | 10/2001 | Grosmougin et al. ....... 123/299 |

* cited by examiner

Primary Examiner—Thomas N. Moulis (74) Attorney, Agent, or Firm—Sughrue Mion Zinn Macpeak (57) ABSTRACT

A fuel injection control system and method for controlling a fuel injection control system of a direct injection internal combustion engine, capable of issuing a pilot and a main injection during fuel injection into an engine cylinder, determining whether a pilot injection is enabled or disabled for each of the plurality of direct injection devices for each engine operation cycle, and modifying a corresponding main injection timing at least on the basis of the pilot injection determination. The fuel injection control system including at least one direct fuel injection device operable to deliver partitioned separate injections of fuel directly into a combustion chamber of the internal combustion engine. The control system operable on the basis of engine operating parameters to control operation of the at least one direct fuel injection device, and to determine the partitioned separate injections of fuel including a pilot injection fuel quantity, a main injection fuel quantity, an anchor injection fuel quantity, a pilot injection timing and duration, a main injection timing and duration, and an anchor injection timing and duration. The fuel injection control system providing these parameters as fuel injection signal to produce the partitioned separate injections of fuel, the fuel injection signal being determined based on predetermined engine operating parameters and information extracted from at least one look-up map. The fuel injection control system being adapted to determine if a change in engine conditions has occurred, and on the basis of such determination to determine whether the pilot injection is enabled or disabled. The fuel injection control system being further adapted to dynamically modify the main injection timing at least on the basis of the pilot injection determination.

17 Claims, 5 Drawing Sheets

Fig. 1.

SEPARATE INJECTOR MAIN TIMING MAPS FOR USE WITH AND WITHOUT PILOT

TECHNICAL FIELD

This invention relates generally to electronically controlled fuel injected engines and, more particularly, to controlling fuel injection signals during certain engine operating conditions such as acceleration or deceleration wherein one or more injections of fuel (shots) associated with a multi-injection fuel injection event may be disabled to better control engine exhaust emissions.

BACKGROUND

Electronically controlled direct fuel injection devices such as electronically controlled fuel injectors are well known in the art including both hydraulically actuated electronically controlled fuel injectors as well as mechanically actuated electronically controlled fuel injectors. Electronically controlled fuel injectors typically inject fuel into a specific engine cylinder as a function of an electronic fuel injection signal received from an electronic fuel injection control device (controller) or system. These signals include waveforms that are indicative of a desired injection rate as well as the desired timing and quantity of fuel to be injected into the cylinders.

Emission regulations pertaining to engine exhaust emissions are becoming more restrictive throughout the world including, for example, restrictions on the emission of hydrocarbons, carbon monoxide, the release of particulates, and the release of nitrogen oxides (NOx). Tailoring the electronic fuel injection current signal waveform and the resulting number of injections and the injection rate of fuel to a combustion chamber during a combustion cycle of the cylinder, as well as the quantity and timing of such fuel injections, is one way to improve emissions and meet higher emissions standards. As a result, multiple fuel injection techniques, wherein the electronic fuel injection signal waveform comprises a plurality of distinct fuel injection signals, have been utilized to modify the burn characteristics of the combustion process in an attempt to reduce emission and noise levels. Multiple fuel injections typically involve splitting the total fuel delivery to the cylinder during a particular injection event into separate fuel injections, such as a pilot injection, a main injection, and an anchor injection, where three injections of fuel (a three shot injection) are desired. Each of these injections may also be referred to generally as a shot, and the term shot as used in the art may also refer to the actual fuel injection or to the command current signal (electronic fuel injection current signal), also referred to simply as a fuel injection signal, to a fuel injector indicative of an injection or delivery of fuel to the engine. At different engine operating conditions, it may be necessary to use different injection strategies in order to achieve both desired engine performance and emissions control.

For example, multiple fuel injection techniques may be utilized at engine operating conditions, including low engine speed and low engine load, while other techniques may be utilized at different engine operating conditions. In the past, the controllability of a multiple fuel injection or split injection event has been somewhat restricted by mechanical and other limitations associated with the particular types of injectors utilized. Even with more advanced electronically controlled injectors, during certain engine operating conditions, it is sometimes difficult to accurately control fuel delivery.

As used throughout this disclosure, an "injection event" is defined as the injections that occur in a particular cylinder or combustion chamber during one cycle of the engine ("cylinder cycle"). For example, one cycle of a four stroke engine for a particular cylinder, includes an intake, compression, expansion, and exhaust stroke. Therefore, the injection event/cylinder cycle in a four stroke engine includes the number of injections, or shots, that occur in a cylinder during the four strokes of the piston. As used in the art, and throughout this disclosure, an "engine operating cycle" includes the individual cylinder cycles for the cylinders included therein. For example, an engine operating cycle for a six cylinder engine will include six individual cylinder cycles, one for each of the cylinders of the engine (with each cylinder cycle having four strokes, for a total of 24 strokes). Generally, the cylinder cycles overlap, so that the beginning of the next successive cylinder cycle of a particular cylinder might begin prior to the completion of the beginning of the next engine operating cycle. The term "shot" as used in the art may also refer to the actual fuel injection or to the command electronic fuel injection current signal (electronic fuel injection current signal), also referred to simply as a fuel injection signal, to a direct fuel injection device, fuel injector or other fuel actuation device indicative of an injection or delivery of fuel to the engine.

U.S. Pat. No. 5,884,602 to Friedrich et al., describes a direct fuel injection compression ignition engine and a process for determining a pilot injection and calculating pilot and main injection fuel quantities. The '602 patent describes computing a total quantity of fuel to be injected into a cylinder, then determining if a pilot injection will be injected and if so, the quantity of fuel to be injected during the pilot injection, then determining a second (main) injection based on the difference between these values. The method described in the '602 patent while balancing torque, does not address concerns of changing engine conditions wherein the timing and/or fuel quantity of the main shot will be varied when a pilot shot is eliminated. The three-shot multiple injection event as set out in this disclosure also provides improved engine exhaust emissions while reducing fuel consumption of the engine.

Desired engine performance is not always achieved using three-shot multiple fuel injections or even two-shot (split) multiple injections at all engine speeds and engine load conditions due to a variety of reasons, including limitations on the different types of achievable injection waveform types, the amount of fuel injected during the separate fuel injections, the timing of injections during the particular injection event, the timing sequence between the injections, and how closely spaced injections influence each other. As a result, problems such as injecting fuel too rapidly within a given injection event and/or allowing fuel to be injected beyond a desired stopping point can adversely affect emission outputs and fuel economy.

In a system in which multiple injections and different injection signal waveforms are achievable, it is desirable to control and deliver any number of separate fuel injections to a particular cylinder so as to minimize emissions and fuel consumption based upon the operating conditions of the engine at that particular point in time, e.g. changes in speed, load, or ambient conditions. This may include splitting the fuel injection into two or more separate fuel shots during a particular injection event, providing larger fuel quantities in the pilot shot, advancing the pilot shot during the injection event, and adjusting the timing between the various multiple fuel injection shots in order to achieve desired emissions and desired fuel consumption. In some situations, it is also desirable to rate shape the front end of the fuel delivery to the cylinder to control the burn characteristics of the particular fuel being utilized. Further, in some situations the particular shot duration or the fuel quantity may be so small that it is not practical to inject the particular shot.

By way of example, during certain acceleration events, not all of the fuel delivered to the engine in the distinct fuel shots of a multi-shot fuel injection event is combusted for a variety of reasons. In one such event where a turbo charger is used, during an acceleration event the air mass delivered to the engine is less because the turbo charger device associated with the engine has to spin up to deliver a greater quantity of air corresponding to the increase in the fuel. When a rich fuel mixture is introduced into the cylinder, more fuel is likely to contact the cylinder walls than with a comparatively leaner fuel mixture. Because a cylinder's walls are typically cooler in comparison to the interior of the cylinder, the fuel does not combust but instead mixes with the cylinder wall lubricating oil. This fuel deteriorates the lubricating quality of the engine oil, and adversely impacts the fuel efficiency of the engine. Furthermore, such uncombusted fuel may be emitted in the form of hydrocarbons, which are a pollutant and therefore an undesirable component of an engine's emissions.

Further during an acceleration event, the time window available for fuel injection events may decrease. It becomes more difficult to inject multiple shots into a shrinking time window for a cylinder as engine speed increases. Rapidly changing engine speed can cause timing errors for all shots and in particular for shots that are placed at a particular piston position (crank angle). However, this is especially applicable to the anchor shot since it occurs a time delay after the main shot. As a result, the time interval between shots, or the time difference between the end of one fuel shot in a particular fuel injection event and the beginning of a subsequent fuel shot in the same fuel injection event, decreases. Therefore, it becomes increasingly important to deliver the individual fuel shots accurately as the timing between fuel shots becomes shorter.

In a deceleration event, on the other hand, the amount of fuel delivered in a fuel injection event decreases. As the amount of fuel decreases, it becomes increasingly difficult to physically partition the fuel into distinct fuel shots. For small enough amounts of fuel, the improperly partitioned amounts of fuel may result in improper or undesirable performance, efficiency, and emissions of the engine. Further during a deceleration event, the time duration of each fuel injection may increase. As discussed for acceleration above, the time to angle conversion for the individual fuel shots may be inaccurate when the speed of the engine is changing. As a result, the inaccurate (or offset) fuel injection events may detrimentally impact the engine's performance, efficiency, and emissions during a deceleration event.

It is therefore desirable to provide an apparatus and method to control the delivery of fuel to an engine to control emissions during acceleration and deceleration. Accordingly, the present invention is directed to overcoming one or more of the problems as set forth above.

SUMMARY OF THE INVENTION

In one aspect of the present invention, an control system and method are disclosed for controlling a fuel injection control system of a direct injection internal combustion engine, capable of issuing a pilot and a main injection during fuel injection into an engine cylinder, determining whether a pilot injection is enabled or disabled for each of the plurality of direct injection devices for each engine operation cycle, and modifying a corresponding main injection timing at least on the basis of the pilot injection determination.

Particularly, the fuel injection control system may include a plurality of direct fuel injection devices operable to deliver partitioned separate injections of fuel directly into corresponding combustion chambers of the internal combustion engine. The control system is operable on the basis of engine operating parameters to control operation of the direct fuel injection devices, and to determine the partitioned separate injections of fuel including a pilot injection fuel quantity, a main injection fuel quantity, an anchor injection fuel quantity, a pilot injection timing and duration, a main injection timing and duration, and an anchor injection timing and duration. The fuel injection control system provides these parameters as fuel injection signal to produce the partitioned separate injections of fuel.

The fuel injection control system is generally adapted to determine if a change in engine conditions has occurred, and on the basis of such determination to determine whether the pilot injection is enabled or disabled. The fuel injection control system is further adapted to dynamically modify the main injection timing at least on the basis of the pilot injection determination.

Another aspect of the present invention describes a method and apparatus for controlling a fuel injection control system to partition fuel output delivery of the fuel injection control system to a plurality of direct fuel injection devices which determines whether a pilot injection is enabled or disabled for each of the plurality of direct injection devices for each engine operation cycle; and modifies a corresponding main injection timing at least on the basis of the pilot injection determination.

BRIEF DESCRIPTION OF THE DRAWINGS

For a better understanding of the present invention, reference may be made to the accompanying drawings in which.

DETAILED DESCRIPTION

Figure 1:
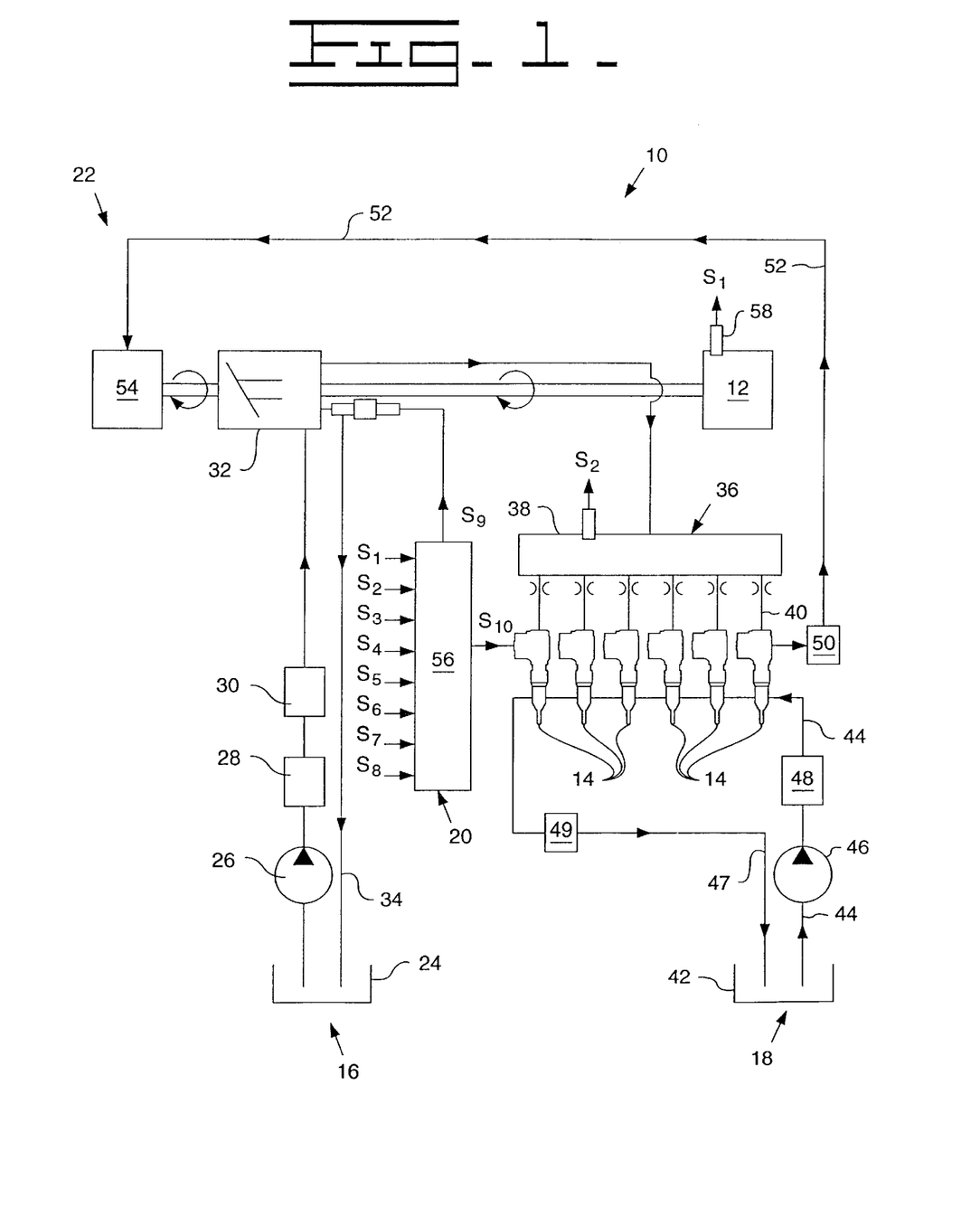
FIG. 1 is a typical schematic view of an electronically controlled fuel injector system usable in one embodiment of the present invention.

Referring to FIG. 1, there is shown one exemplary embodiment of a hydraulically actuated electronically controlled fuel injection system 10 in an exemplary configuration as adapted for a direct-injection compression ignition engine 12. Fuel system 10 includes one or more electronically controlled fuel injection devices, such as a fuel injector 14, which are adapted to be positioned in a respective cylinder head bore of the engine 12. While the embodiment of FIG. 1 applies to an in-line six cylinder engine, it is recognized and anticipated, and it is to be understood, that the present invention is also equally applicable to other types of engines such as V-type engines and rotary engines, and that the engine may contain any number of cylinders or combustion chambers (not shown). In addition, while the embodiment of FIG. 1 also illustrates a hydraulically actuated electronically controlled fuel injector system, it is likewise recognized and anticipated that the present invention is equally applicable to other types of fuel injection devices, including electronically controlled injectors, mechanically actuated electronically controlled injector units as well as fluid activated common rail type fuel injection systems with digitally controlled fuel valves. The fuel system 10 of FIG. 1 includes an apparatus or means 16 for supplying actuation fluid to each injector 14, an apparatus or means 18 for supplying fuel to each injector, electronic control means 20 for controlling the fuel injection system, including the manner and frequency in which fuel is injected by the injectors 14, for example, including timing, number of injections per injection event, fuel quantity per injection, time delay between each injection, and the injection profile. The fuel injection system 10 may also include apparatus or means 22 for recirculating actuation fluid and/or recovering hydraulic energy from the actuation fluid leaving each injector 14.

The actuating fluid supply apparatus or means 16 preferably includes an actuating fluid sump or reservoir 24, a relatively low pressure actuating fluid transfer pump 26, an actuating fluid cooler 28, one or more actuation fluid filters 30, an actuation fluid high pressure pump 32 for generating relatively high pressure in the actuation fluid, and at least one relatively high pressure actuation fluid manifold or rail 36. A common rail passage 38 is arranged in fluid communication with the outlet from the relatively high pressure actuation fluid pump 32. A rail branch passage 40 connects the actuation fluid inlet of each injector 14 to the high pressure common rail passage 38. In the case of a mechanically actuated electronically controlled injector, manifold 36, common rail passage 38 and branch passages 40 would typically be replaced with some type of cam actuating arrangement or other mechanical means for actuating such injectors. Examples of a mechanically actuated electronically controlled fuel injector unit are disclosed in U.S. Pat. Nos. 5,947,380 and 5,407,131.

Apparatus 22 may include a waste accumulating fluid control valve 50 for each injector (only shown by way of example), a common recirculation line 52, and a hydraulic motor 54 connected between the actuating fluid pump 32 and recirculation line 52. Actuation fluid leaving an actuation fluid drain of each injector 14 would enter the recirculation line 52 that carries such fluid to the hydraulic energy recirculating or recovering apparatus or means 22. A portion of the recirculated actuation fluid is channeled to high pressure actuation fluid pump 32 and another portion is returned to actuation fluid sump 24 via recirculation line 34.

In a preferred embodiment, the actuation fluid is engine lubricating oil and the actuating fluid sump 24 is an engine lubrication oil sump. This allows the fuel injection system to be connected as a parasitic subsystem to the engine's lubricating oil circulation system. Alternatively, the actuating fluid could be fuel or some other type of suitable liquid.

The fuel supply apparatus or means 18 preferably includes a fuel tank 42, a fuel supply passage 44 arranged in fluid communication between the fuel tank 42 and the fuel inlet of each injector 14, a relatively low pressure fuel transfer pump 46, one or more fuel filters 48, a fuel supply regulating valve 49, and a fuel circulation and return passage 47 arranged in fluid communication between each injector 14 and fuel tank 42.

Electronic control means 20 preferably includes an electronic control module (ECM) 56, also referred to as a controller, the use of which is well known in the art. ECM 56 typically includes processing means such as a microcontroller or microprocessor, a governor such as a proportional integral derivative (PID) controller for regulating engine speed, and circuitry including input/output circuitry, power supply circuitry, signal conditioning circuitry, solenoid driver circuitry, analog circuits and/or programmed logic arrays as well as associated memory. The memory, which may be a RAM, a ROM, or other type of memory known in the art is connected to the microcontroller or microprocessor and stores instruction sets, maps, lookup tables, variables, and more. This memory may be referred to generally as a data storage. ECM 56 or a portion thereof may be used to control many aspects of fuel injection, including (1) the fuel injection timing, (2) the total fuel injection quantity during an injection event, (3) the fuel injection pressure, (4) the number of separate injections or fuel shots during each injection event, (5) the time intervals between the separate injections or fuel shots, (6) the time duration of each injection or fuel shot, (7) the fuel quantity associated with each injection or fuel shot, (8) the actuation fluid pressure, (9) electrical current level of the injector waveform, and (10) any combination of the above parameters. Hence, the ECM 56 or a portion thereof will also be referred to as an electronic fuel injection control device or electronic fuel injection control system. Each of the described parameters are variably controllable independent of engine speed and load. ECM 56 receives a plurality of sensor input signals $S_1$–$S_8$ which correspond to known sensor inputs, such as engine operating conditions including engine speed, engine temperature, pressure of the actuation fluid, cylinder piston position and so forth, that are used to determine the desired combination of injection parameters for a subsequent injection event.

For example, an engine temperature sensor 58 is illustrated in FIG. 1 connected to engine 12. In one embodiment, the engine temperature sensor includes an engine oil temperature sensor. However, an engine coolant temperature sensor can also be used to detect the engine temperature. The engine temperature sensor produces a signal designated by $S_1$ in FIG. 1 and is inputted to ECM 56 over line $S_1$. In the particular example illustrated in FIG. 1, ECM 56 issues control signal $S_9$ to control the actuation fluid pressure from pump 32 and a fuel injection signal $S_{10}$ to energize a solenoid or other electrical actuating device within each fuel injector 14 thereby controlling fuel control valves within each injector 14 and causing fuel to be injected into each corresponding engine cylinder. Each of the injection parameters are variably controllable, independent of engine speed and load. In the case of the fuel injectors 14, control signal $S_{10}$ is a fuel injection signal that is an ECM commanded current to the injector solenoid or other electrical actuator.

Figure 2:
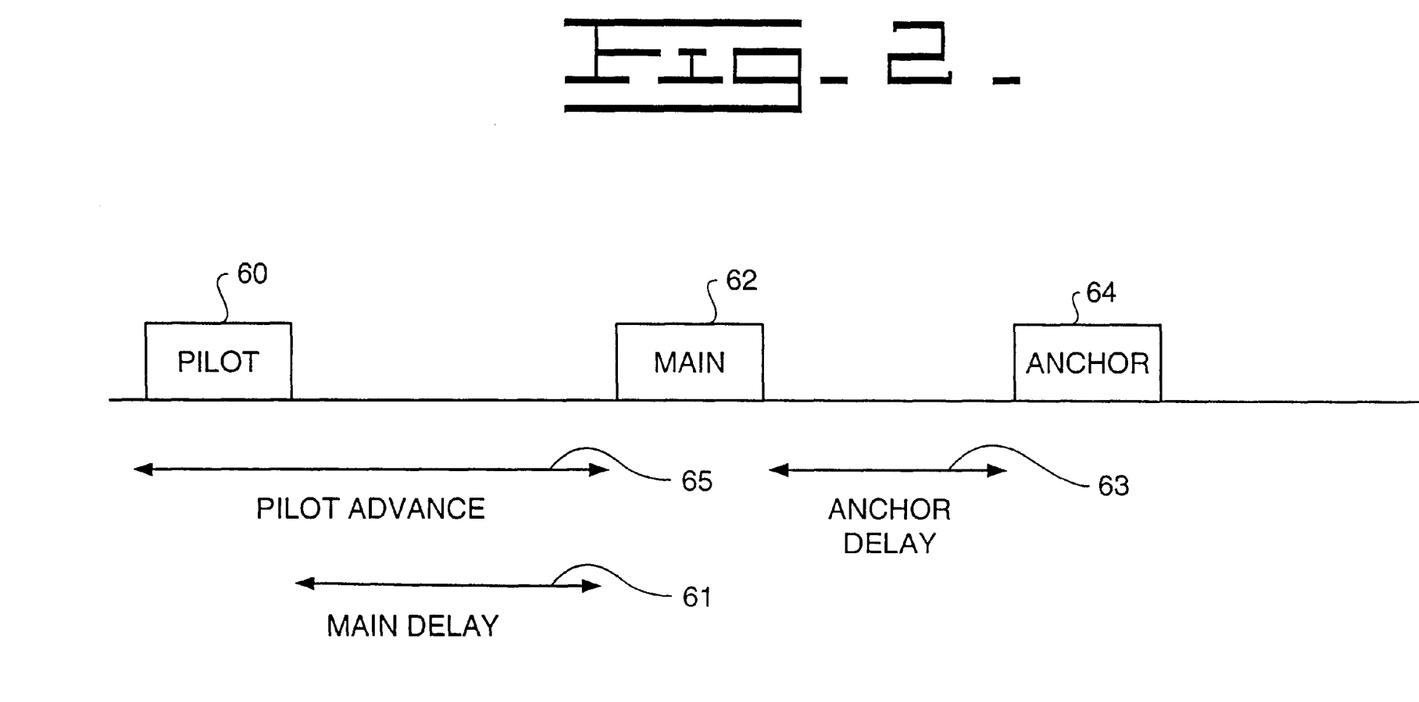
FIG. 2 is a schematic profile of a three shot fuel injection event.

It is recognized that the type of fuel injection desired during a particular fuel injection event will typically vary depending upon various engine operating conditions at the time. In an effort to improve emissions, it has been found that delivering multiple fuel injections to a particular cylinder during a fuel injection event or cylinder cycle at certain engine operating conditions achieves both desired engine operation as well as emissions control. Under certain engine operating conditions, a fuel injection event utilizing three fuel shots has advantages in terms of exhaust emissions. However, under certain circumstances, it may be desired to reduce the injection event to a single shot, by eliminating the pilot shot and combining the main and anchor shots, or to modify the event to have two or more shots by combining the main and anchor shots. It may also be desirable under certain circumstances to increase the injection event to include four or more shots by adding a post injection shot, depending on the current engine operating conditions. FIG. 2 schematically illustrates an injection event with multiple shots, including in sequence a pilot shot 60, a main shot 62, and an anchor shot 64. The pilot shot 60 is injected into the combustion chamber in advance of the main shot 62 by some predetermined time factor, crank angle or the like that determines a pilot advance 65 and results in a time between the end of the pilot shot 60 and the beginning of the main shot 62 that defines a main delay 61. The anchor shot 64 is sequenced after the main shot 62 based upon a predetermined time factor, crank angle or the like that results in an anchor delay 63.

The sequence, timing and duration of the shots in an injection event are determined by the ECM 56, based upon programming stored in memory and a plurality of specialized maps, equations, calculations and/or lookup tables stored within the memory of ECM 56. Such maps, equations, calculations and/or tables are operative to correlate characteristics of the pilot shot, the main shot, the anchor shot, and the anchor shot delay, for example, to specified engine operation parameters, such as engine speed, engine load, the pressure associated with rail passage 38 (rail pressure), desired total fuel quantity and other parameters, on the basis of data returned from the maps, equations, calculations or look-up tables. Specifically, using such maps, equations, calculations or tables, ECM 56 also can dynamically determine the appropriate number of fuel shots to be used for a given injection event (e.g., pilot 60, main 62 and/or anchor 64), the quantity of fuel required for each fuel shot, the timing and duration of each individual shot as well as the anchor delay 63. That is, programming associated with electronic controller 56 includes parameters that are determined by computations and/or logical comparisons during program execution, with reference, for example, to the maps, equations, calculations and/or lookup tables. Thus, any of the above-mentioned parameters with respect to the arrangement of shots illustrated in FIG. 2, or combination thereof, may be selectively and/or dynamically adapted or altered over time, both with respect to individual cylinder cycles and over a single or multiple engine operating cycles.

It should be noted that while a pilot shot 60 precedes in time a main shot 62, the ECM 56 may use parameters of the main shot 62 to determine whether to enable or disable the pilot shot 60. Thus a main shot 62 may be referred to as a first shot and a pilot shot 60 may be referred to as a second shot, as set out in detail below. An anchor shot 64 may also be referred to as a third shot, or may simply be referred to with the main shot as a primary shot, this shot also referred to generally as a first shot.

In the three shot multiple injection depicted in FIG. 2, a portion of the total fuel to be delivered to the combustion chamber will be injected by the pilot shot 60, a portion of such total fuel will be injected by the main shot 62, and the remaining portion of the total fuel to be injected will be injected by the anchor shot 64. Under certain engine operating conditions, a multiple fuel injection event utilizing three fuel shots has advantages in terms of exhaust emissions, including reduced particulate emissions and/or reduced NOx emissions as well as maintaining desired engine performance as will be hereinafter explained. The multiple fuel injection event may include 2, 3 or more shots depending on the current engine operating conditions.

Typically, in a three shot injection event, the pilot injections are approximately 5% to 40% of the total fuel delivered to the injectors during a particular injection event, the main injections are approximately 3% to 40% of the total fuel delivered during a particular injection event, and the anchor injection will include the remaining total fuel to be delivered during a particular injection event.

As fuel and air are mixed and compressed during the compression stroke, eventually the mixed fuel and air reach thermodynamic conditions where combustion occurs. In this regard, based upon the quantity of fuel allocated to the pilot shot, the pilot fuel/air mixture will typically be combusted sometime during the compression stroke. In one embodiment, it has been found that the pilot fuel/air mixture will combust in a compression ignition engine during the compression stroke independent of when the pilot shot is injected into the cylinder. It is recognized and anticipated that combustion may occur outside of this range, specifically the compression stroke, due to several factors including the fuel quantity associated with the pilot shot, the rail or injector pressure, air intake, engine speed, engine load and other parameters. The subsequent fuel shots associated with a multiple fuel injection, such as the main and/or anchor shot, may be delivered directly into the flame front of the pilot shot combustion. This can be desirable depending upon engine operating conditions because such fuel will be more thoroughly combustible when injected into the pilot flame front.

In the three shot multiple injection event, depicted in FIGS. 2, the pilot shot may be added or included, or alternately eliminated; and the quantity of fuel, timing and duration associated with the pilot shot may be adjusted according to engine operating conditions and the desired engine exhaust emissions. Thus the pilot shot may be dynamically added to, eliminated from, or adjusted during any multiple injection event in associated with any combustion chamber during any engine operating cycle. For example, the pilot shot may be included in a multiple injection event during one cylinder cycle for one combustion chamber during a first engine operating cycle, and may be eliminated during the next engine operating cycle. Further, a pilot shot may be included in two, three or all multiple injection events during corresponding cylinder cycles for the respective combustion chambers during a first engine operating cycle, and may be eliminated from one, two, three, or all multiple injection events during the next engine operating cycle. The parameters of the respective pilot shots may also be adjusted during these events. The present control system can therefore dynamically adapt to the engine operating conditions and dynamically determine the number of fuel shots, the quantity and placement of each such shot and the other associated injection parameters accordingly.

In one embodiment of the present invention, empirical data for a given engine configuration and conditions are stored in a memory area or location within the fuel injection control device or system which may preferably be included in the ECM 56. This data may be stored as a map or look-up table for interpolation by the ECM 56. From such data, a pilot injection fuel quantity and timing and a main injection fuel quantity and timing can be determined for a given system at a plurality of engine operating conditions and loads. Thus, the ECM 56 can periodically adjust the pilot and main shot fuel quantity and timing to correspond to a determined injection fuel amount and timing based upon engine operating conditions. The stored data is converted into injector pull-in and hold-in time increments corresponding to each fuel injector for each cylinder cycle by, for example, programming or algorithms of the ECM 56, which may in turn be implemented using software and/or hardware units. The fuel injector open time is determined from the data, for example, a table stored in the ECM's memory. The ECM 56 then commands the corresponding fuel injector 14 to open at the correct timing, and commands the fuel injector 14 to close at a time when the determined quantity of fuel has been injected into the cylinder. These commands are accomplished using the current wave-forms described in detail below. In some applications it may also be desirable to convert the stored data into curve fit equations that are utilized by the ECM 56 as an alternative to a "look-up" table, as previously described. In such a case, the injector pull-in and hold-in time would be calculated via a curve fit function utilizing the engine operating conditions sensed by the ECM.

Figure 3:
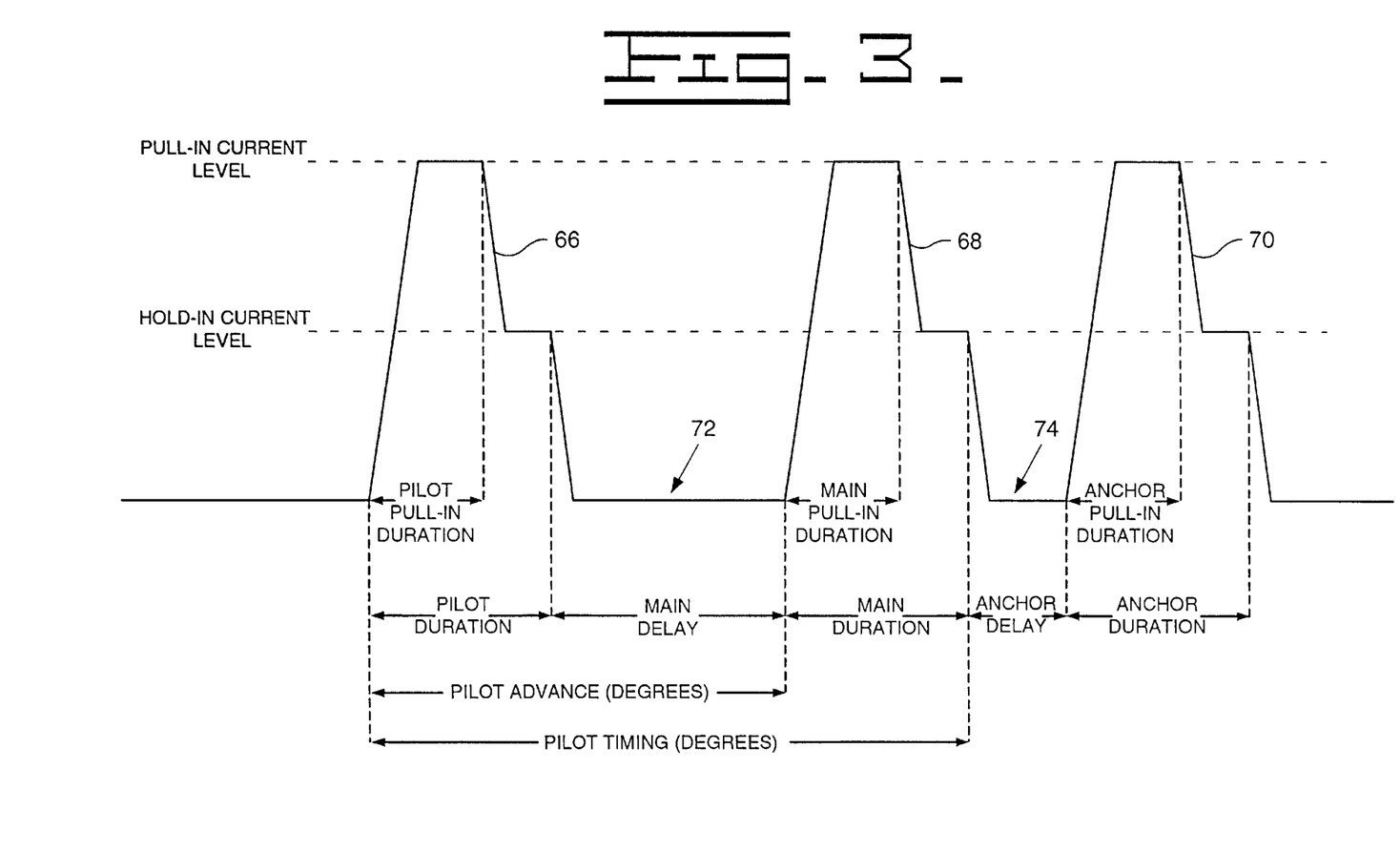
FIG. 3 is a schematic diagram of an exemplary current waveform for a three shot fuel injection event.

An exemplary current waveform or fuel injection signal for a three shot injection event is illustrated in FIG. 3 showing a pilot shot control signal or simply pilot signal 66, a main shot control signal or simply main signal 68, an anchor shot control signal or simply anchor signal 70, a main delay signal 72 between the pilot and main shot control signals (66, 68), and an anchor delay signal 74 between the main and anchor shot control signals (68, 70). The duration of each of the control signals 66, 68 and 70 can be varied by ECM 56, and the duration of delays 72 and 74 can likewise be controlled by ECM 56. In one exemplary embodiment of the invention, the timing and duration of the main shot 62 is determined and set by ECM 56 and the timing and duration of the pilot shot 60 and anchor shot 64 are thereafter determined based upon the main shot timing. Thus, as set out above, the main shot 62 may be referred to as a first shot, a pilot shot 60 may be referred to as a second shot, and the anchor shot 64 may be referred to as a third shot. Corresponding fuel injection signals for the pilot, main and anchor shots may likewise be referred to as second, first and third fuel injection signals, respectively. In this regard, the start of the second or pilot shot 60 will typically be determined based upon known parameters such as the first or main shot timing and duration and pilot advance, and the third or anchor shot timing will be just a time delay based upon termination of the main shot 62. Other methods for determining the various parameters associated with the three fuel injection shots are likewise recognized and anticipated.

FIG. 3 also generally illustrates the relative pull-in and hold-in current levels associated with a typical hydraulically actuated electronically controlled fuel injector or other fuel injection device. When using hydraulically actuated electronically controlled fuel injectors, the injection signal or waveform generally includes a two-tier form that includes a pull-in current level and a generally lower hold-in current level. The higher pull-in current is used to quickly open the fuel injector and thereby decrease the response time, that is, the time between the initiation of a fuel injection signal and the time in which fuel actually begins to enter the engine cylinder. Once fuel injection has commenced, a lower level hold-in current can be used to hold the injector 14 open for the remainder of the injection event. The pilot, main and anchor pull-in durations are likewise generally illustrated in the representative current waveform depicted in FIG. 3. Based upon engine operating conditions, the type of fuel and fuel injection devices being utilized, and other parameters, it is recognized and anticipated that the waveform illustrated in FIG. 3 may be modified and altered accordingly.

In addition, although the present multiple fuel injection events have been discussed in terms of an exemplary fuel injection (current) signal waveform such as the exemplary waveform illustrated in FIG. 3 wherein a separate fuel injection (current) signal or pulse actuates each fuel shot, it is also recognized that other types of control signals, for example hydraulic pressure, could be used in connection with other types of direct fuel injection device (fuel injectors) and fuel injection schemes. For example, some fuel injectors use hydraulic pressure to control injection timing and in those systems, a separate pressurization of the actuating fluid may take place for the injection of each fuel shot.

During normal engine operating conditions, after analysis of several engine related conditions, a desired electronic fuel injection current signal waveform, as shown in FIG. 3, is determined and generated which will generally produce a main injection or shot 62, an anchor injection or shot 64, and possibly a pilot injection or shot 60 as shown in FIG. 2. Once the desired number of injections is determined for a particular multiple injection event, the desired fuel quantity for the cylinder cycle is partitioned into the appropriate separate fuel injections (pilot, main and anchor). Maps, equations, calculations or look-up tables are used to assist in these determinations which indicate the timing and fuel quantity for each injection. Upon completion of these determinations a check is made to determine if the waveform should still include the number of fuel injections as originally desired. For example, the initial fuel injection strategy may include a pilot injection 60, a main injection 62 and an anchor injection 64. The fuel injection signal representing this initial strategy may include these three injections with associated injection duration and injection delays, as shown in FIG. 3 above. However, during certain periods of engine operation (e.g., engine acceleration or deceleration), the pilot injection portion of the fuel injection signal may have to be reduced or even cancelled. This may be caused by an acceleration event where the time window for fuel injection is decreased, as set out above, or may be due to possible fuel dilution of engine lubricating oil, as discussed in detail below. Therefore, after the timing and fuel quantities are determined for each of the fuel injections or shots, what was originally anticipated as being a three injection event signal waveform, may now only include two injections in the injection event. The enabling or disabling of a pilot injection 60 may have significant ramifications on engine exhaust emissions. When a pilot injection 60 is used, generally the main injection timing will be retarded. When a pilot injection of fuel 60 is injected into the combustion chamber, the combustion of the pilot injection of fuel 60 creates a cool flame front which enables the main injection 62 to ignite. However, if the pilot injection 60 is not present, then the main injection 62 will take longer to ignite because the fuel has to be injected, mixed with air, and reach the appropriate temperature due to compression, before it will ignite. Therefore, to achieve the appropriate main combustion timing leading to the desired engine performance and the desired engine exhaust emissions, the main injection will need to be advanced in time when no pilot injection is present. One embodiment of the present invention determines whether a pilot injection 60 is enabled or disabled, and dynamically modifies the timing of the main injection 62 (main injection timing) in accordance with separate timing maps, equations or values, one when a pilot injection 60 is enabled, the other when a pilot injection 60 is disabled.

During engine acceleration, the speed of the engine increases in accordance with governor control and the requested increased engine speed command and an additional amount of fuel is delivered to the engine to facilitate the acceleration. This additional amount of fuel delivered to the engine during an acceleration event generally requires a corresponding amount of additional air in order to maintain desired emission and performance standards, which is usually generated and supplied by a turbo charger device associated with the engine. This turbo charged air is mixed with the fuel to facilitate complete combustion of all fuel delivered to the respective cylinders in engine 12. During certain acceleration conditions, however, the turbo charger device may not respond quickly enough to increase the amount of air in proportion to the additional amount of fuel being delivered to the engine. As a result, the fuel-to-air ratio may increase significantly during certain acceleration events with the air/fuel mixture being too rich with fuel. The same problem may also occur in engines without turbo chargers. In turbocharged systems, the inadequate amount of air is usually due to the delay in the response time of the turbo charger device, which usually requires time to spin up to perform at the desired capacity during an acceleration event. The high fuel-to-air ratio allows more fuel to contact the cylinder walls than with a comparatively leaner fuel mixture. The walls of the cylinder are usually comparatively cooler, whereby this fuel may not combust and instead will be mixed with the cylinder wall lubricating oil. This uncombusted fuel may deteriorate the lubrication properties of the oil, and it may also be emitted from the engine as hydrocarbons. Those skilled in the art will appreciate that the occurrence of either of these events is undesirable.

Disabling shots, such as the pilot shot 60, in a fuel injection event during acceleration may reduce the occurrence of fuel penetration to the cylinder walls, which reduces fuel dilution of the lubrication oil and the amount of hydrocarbon byproducts in the engine's exhaust emissions. A decrease in the amount of uncombusted fuel in the cylinder helps improve the fuel efficiency and emissions of the engine. Accordingly, in one exemplary embodiment of the present invention, the pilot shot 60 is disabled during an acceleration event and the timing of the main shot 62 is dynamically modified accordingly, this may include dynamically modifying the main shot timing and duration. Dynamically modifying the main shot parameters in this way considerably reduces the likelihood of occurrence of the problems discussed above during the acceleration event.

During a deceleration event, on the other hand, the amount of fuel delivered to the cylinders of engine 12 generally decreases rapidly. As the amount of fuel decreases, at some point, the overall quantity of fuel is not sufficient to allocate fuel to the pilot shot. Therefore, during a deceleration event, the total number of fuel shots generally will be decreased. In one embodiment of the present invention the pilot shot 60 is eliminated and the main shot 62 timing and duration may be dynamically modified accordingly. It is recognized and anticipated that just the pilot shot 60, or any combination of shots, may be disabled during a deceleration event. As a result, the amount of fuel delivered to the respective cylinder may be partitioned in a lesser number of shots, and the problems associated with time to angle conversion errors in the start times of the plurality of fuel shots are decreased. Accordingly, disabling one or more shots during a deceleration event reduces the likelihood of occurrence of the problems discussed above during the deceleration event.

In one embodiment of the present invention, the pilot fuel injection or pilot shot 60 may be disabled for engine operating conditions other than acceleration or deceleration. In these occurrences, the pilot shot 60 may then be disabled or removed from subsequent fuel injection events gradually during multiple cylinder cycles and engine operation cycles. Cylinders having a pilot shot 60 (a cylinder cycle including an injection event including a pilot injection of fuel) have a main injection timing determined by information extracted from a memory area of the ECM 56 preferably including a look-up map in which pilot injections are active (pilot injection duration not equal to zero). Cylinders not having pilot injections of fuel or pilot shots 60 have a main timing determined from information extracted from a separate look-up map in which pilot injections are disabled (pilot injection duration equal to zero). Thus, even when the pilot injection of fuel is removed over a period including multiple engine operation cycles, engine performance as well as fuel economy and emissions requirements can be maintained.

ECM 56 may also be designed to remove or disable one or more fuel injection shots only for the duration of a respective acceleration or deceleration event when such an event is detected. As the engine approaches the commanded engine speed and the acceleration or deceleration is reduced, whichever the particular event may be, the fuel injection signals may be returned to normal, that is, the disabled shot or shots may be re-enabled, provided that the ECM 56 determines that a pilot shot is not desirable, either gradually over a number of electronic fuel injection current signals (cylinder and engine operation cycles), or more abruptly in a single fuel injection event. It is recognized and anticipated that the particular strategy implemented will typically vary from one embodiment to another. In one embodiment of the present invention, the pilot shot 60 is re-enabled or added into fuel injection events gradually over a period of multiple cylinder cycles and engine operation cycles, unless additional fuel is commanded by the ECM 56.

Figure 4:
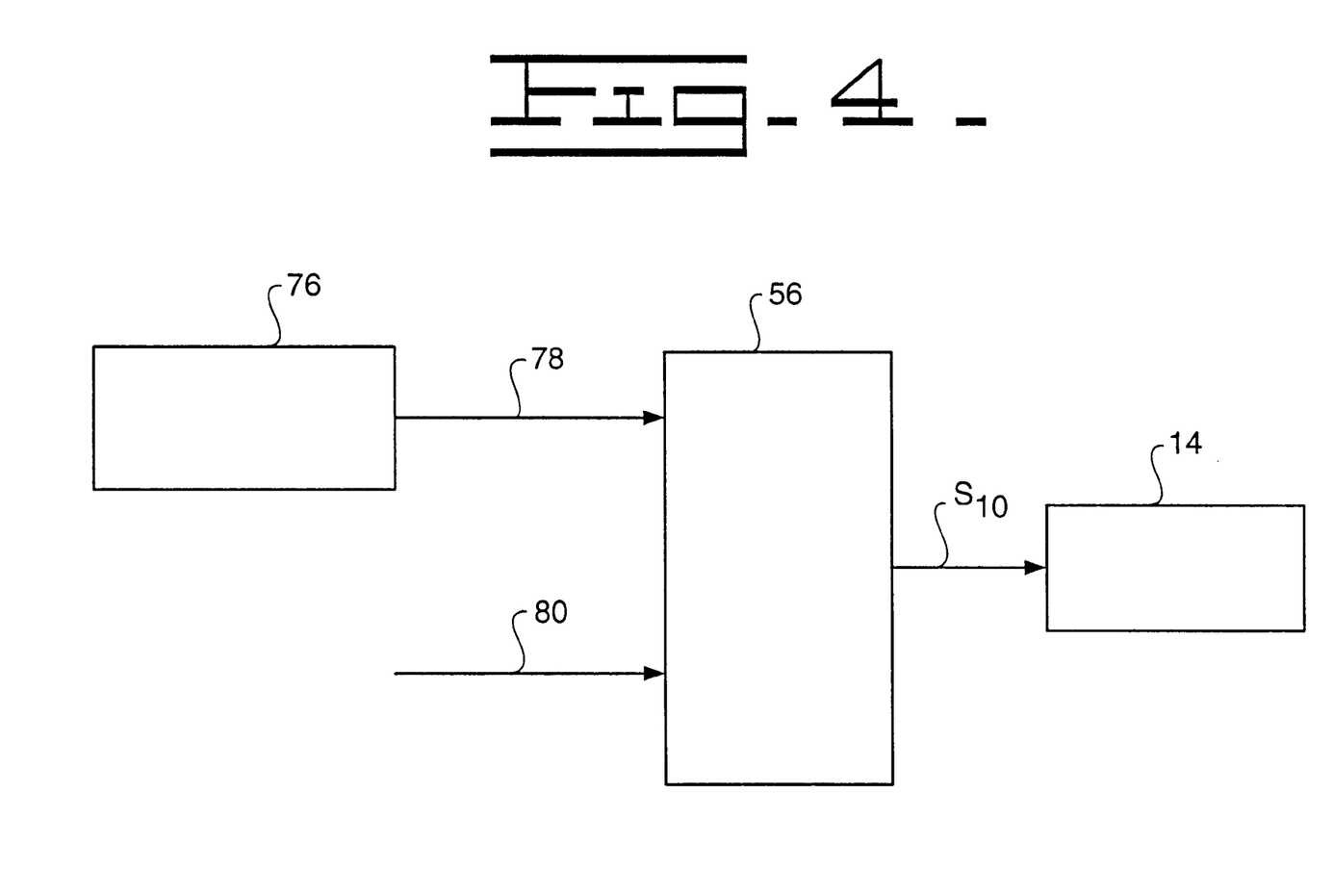
FIG. 4 is a graphical illustration of one embodiment of an electronic control system constructed in accordance with the teachings of the present invention.

In order to practice the present invention, electronic control means 20 or ECM 56 must be operable to detect, determine or otherwise recognize certain engine acceleration or deceleration conditions such that the electronic fuel injection current signal can be controlled accordingly to achieve the desired electronic fuel injection current signal waveform, including the number of shots therein. This may be accomplished in a variety of ways, and any one or a combination thereof may be utilized. In one exemplary embodiment, as shown in FIG. 4, a signal generating means such as an engine speed sensor 76 is coupled to ECM 56 and is operable to output a signal 78 thereto indicative of the speed of the engine. Based upon input signal 78, ECM 56 is operable to determine the rate of change of the engine speed over time. If the rate of change of the engine speed exceeds a predetermined threshold value, for example, in the range of about 1,000 rpm to about 2,000 rpm per second, ECM 56 will determine or recognize that this rate of speed change is indicative of an acceleration or deceleration event which will exceed a predetermined emissions limit, and will therefore control the fuel injection signals $S_{10}$ accordingly. In this exemplary embodiment of a control system constructed in accordance with the teachings of the present invention, the ECM 56 receives inputs, for example, from at least the engine speed sensor 76 as input signal 78. Through programming and or algorithms of the ECM 56, these inputs are used to determine the fuel injection signal $S_{10}$ which is output to at least one direct fuel injection device 14.

In another embodiment, ECM 56 is operable to receive a signal 80 indicative of the air-to-fuel ratio of the fuel mixture being delivered to the cylinders of the engine. During certain acceleration events, the air-to-fuel ratio will decrease due to an increase in the amount of fuel delivered to the engine. During certain other deceleration events, the air-to-fuel ratio will increase due to a decrease in the amount of fuel delivered to the engine. ECM 56 will thus determine or otherwise recognize certain acceleration or deceleration conditions if the air-to-fuel ratio increases or decreases by a predetermined threshold amount. ECM 56 will thereafter control the fuel injection signals accordingly.

In yet another embodiment of the present invention, numerous inputs may be provided as a basis for determining a fuel injection signal waveform. These inputs are used by the ECM 56 for determining the fuel injection signal parameters (as described with respect to FIG. 3) for controlling the fuel injection devices 14. These inputs may include a battery voltage and engine speed that are used by the ECM 56 to determine whether a thermal protection limit has been reached for the ECM 56. If the thermal protection limit has been reached, then the ECM will reduce the number of shots to reduce the power output of the ECM 56, i.e., issue fewer current pulses during an injection event, to thereby reduce the heating of the power electronics inside ECM 56. This protects the electronics within the ECM 56 from overheating. Programming of the ECM 56 determines a waveform transitioning strategy using the engine speed input. This strategy is described in detail previously. Also, the determination of whether to provide the pilot shot 60 during a particular cylinder cycle for a particular cylinder is based on the engine operating parameters described above. The ECM 56 also determines whether a portion of the fuel injection signal waveform should be disabled due to, for example, the occurrence of an acceleration event, or on the basis of engine operating conditions such as engine speed, engine load, engine oil pressure, a predetermined noise limit, a predetermined smoke limit, and a predetermined torque limit. The acceleration event may be determined, for example, as previously described, by a change in engine speed over time which is greater than a predetermined limit. A portion of the fuel injection signal may then be eliminated if predetermined conditions occur such that the noise limit, noise limit, smoke limit and/or torque limit are exceeded.

Figure 5:
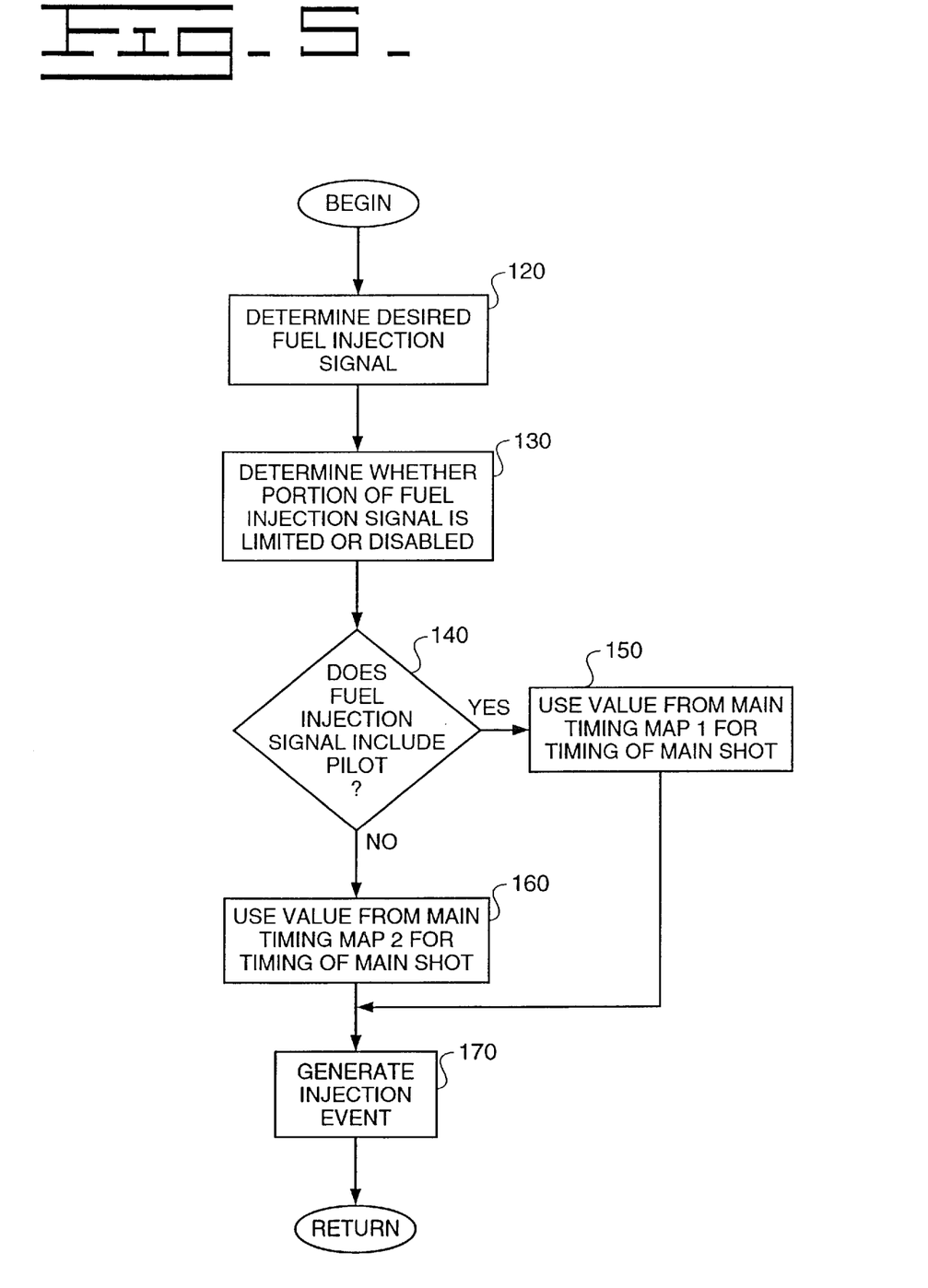
FIG. 5 illustrates the injection control process according to an aspect of the invention.

A flowchart illustrating the operation of an embodiment of the present invention is shown in FIG. 5. Any of the previously described inputs, as well as the previously described one or more look-up maps are used by the ECM 56 in step 120 to determine the desired fuel injection signal parameters. These parameters may include (as shown in FIG. 3), a pilot fuel injection signal timing and duration, a main fuel injection signal timing and duration and an anchor fuel injection signal timing and duration. The fuel injection signal timing and duration may be determined, for example, based on engine operating parameters such as a desired overall quantity of fuel to be injected into the cylinder during the injection event, engine speed, engine load, rail pressure or other parameters which may depend on the particular fuel system. In step 130, as set out above, the ECM 56 determines whether a portion of the fuel injection signal, particularly a pilot fuel injection signal portion, is limited or disabled due to an acceleration event, or on the basis of other engine operating conditions. In step 140 a determination is made by the ECM 56 whether a pilot fuel injection signal is provided as a portion of the particular fuel injection signal, as set out above.

In step 150, the ECM 56 determines the timing of the main fuel injection signal timing by retrieving a value from a first look-up table when the fuel injection signal includes a pilot fuel injection signal portion. The process then continues to step 170. Similarly, in step 160, the ECM 56 determines the timing of the main fuel injection signal timing by retrieving a value from a second look-up table when the fuel injection signal does not include a pilot fuel injection signal portion. The process also then continues to step 170. In step 170, the fuel injection signal is output to the fuel injection devices 14 to generate the fuel injection event. The process then repeats for the next cylinder cycle.

It is recognized and anticipated that any one or a plurality of other signal providing mechanisms may likewise be coupled to ECM 56 for providing a signal thereto indicative of a condition which can be correlated to engine operating conditions including an acceleration or deceleration event wherein a desired emissions limit might be exceeded. Such mechanisms may be any of the various mechanisms known in the art such as a rail pressure sensor, an air intake boost pressure sensor and still other sensors.

Industrial Applicability

As described herein, the present apparatus and method has particular utility in all types of engines, such as engines utilized in vehicles, work machines, marine vessels, electrical generators, stationary engines, and the like. The present apparatus and method, therefore, provides a control system and method for controlling the electronic fuel injection current waveform and corresponding the number of fuel shots in any multi-shot fuel injection event based upon certain engine operating condition such as acceleration or deceleration conditions, which yield undesirable exhaust emissions.

It is recognized and anticipated that the engine threshold values, the time periods of engine performance monitoring by electronic control means 20, and the like, may be pre-programmed into the electronic control means 20, or such values may be available in maps or tables stored in a memory means or data storage means associated with electronic control means 20. Alternatively, such values may be determined by appropriate formulas or mathematical computations to be performed by ECM 56 in a continuing loop or at fixed time intervals. In this regard, appropriate fuel maps relating rail pressure, engine speed, engine load, pilot/main/anchor duration times, pilot/main/anchor fuel quantities, anchor timing delays, pilot/main timing, and other parameters can be stored or otherwise programmed into ECM 56 for use during all operating conditions of the engine. These operational maps, tables and/or mathematical equations stored in the ECM programmable memory determine and control the various parameters associated with the appropriate multiple injection events to achieve desired engine performance. Accordingly, it is recognized and anticipated that electronic control means 20 may perform such steps in any one of the various ways known in the art.

It is also recognized and anticipated that electronic control means 20 may determine or recognize certain acceleration or deceleration events and reduce, eliminate or disable one or more fuel shots associated with the fuel injection signal based upon just one of the various inputs thereto, or it may do so based upon a combination of such inputs, possibly even giving different weight to the different input values. Further, it is recognized and anticipated that the action taken by electronic control means 20 may be any one or a combination of the various actions that it is capable of taking, such as eliminating or disabling only the pilot shot, or modifying the timing of the main injection 62.

It is recognized and anticipated that ECM 56 may be designed to eliminate or disable one or more fuel injection shots only for the duration of the respective acceleration or deceleration event. As the engine catches up and is no longer accelerating or decelerating, whichever the case may be, the fuel injection signals may be returned to normal, that is, the disabled shot or shots are re-enabled, either gradually over a number of fuel injection signals, or more abruptly in a signal fuel injection event, or electronic control means 20 may keep one or more fuel injection shots disabled for a certain amount of time or until another predetermined criteria is satisfied.

It may be anticipated that engine efficiency and performance may be sacrificed during certain acceleration events to control emissions if the amount of fuel being provided to the engine during such event is decreased when one or more shots are disabled. It may also be appreciated that disabling one or more fuel shots during certain deceleration events will not be particularly detrimental to the performance of the engine since the engine is decelerating, and providing additional fuel during such deceleration event will usually not be necessary. In both events, however, it may be appreciated that the overall emissions of engine 12 may be maintained within desirable limits, and the overall emissions are maintained within desirable limits in the preferred embodiment. As is evident from the foregoing description, certain aspects of the present invention are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the sprit and scope of the present invention.

Other aspects, objects and advantages of the present invention can be obtained from a study of the drawings, the disclosure and the appended claims.

What is claimed is:

1. A method for controlling a fuel injection control system having a plurality of direct fuel injection devices the control system capable of issuing a pilot and a main injection during fuel injection into an engine cylinder, the method comprising:

determining whether a pilot injection is enabled or disabled for each of the plurality of direct injection devices for each engine operation cycle, wherein the step of determining whether a pilot injection is enabled or disabled is based upon detecting whether a pilot fuel injection occurred in the preceding cylinder cycle; and modifying a corresponding main injection timing at least on the basis of the pilot injection determination.

2. A direct injection compression ignition internal combustion engine including a plurality of combustion chambers, comprising:

a plurality of direct fuel injection devices, one of the direct injection devices provided for each one of the plurality of combustion chambers, and operable to inject fuel directly the one of the plurality of combustion chambers; and a fuel injection controller, the fuel injection controller operable to provide to each of the plurality of direct fuel injection devices at least a first fuel injection signal during a corresponding cylinder cycle of the corresponding one of the plurality of combustion chambers, to produce a first injection of fuel;

wherein the fuel injection controller is operable to provide a second fuel injection signal to at least one of the plurality of direct fuel injection devices to produce a second injection of fuel during a corresponding cylinder cycle of the corresponding one of the plurality of combustion chambers, and wherein the fuel injection controller determines, based on predetermined engine operating parameters, the number of the plurality of direct fuel injection devices to which the second fuel injection signal will be applied during an engine operating cycle, and determines the corresponding first injection timing for each of the plurality of combustion chambers at least on the basis of the second fuel injection determination, wherein the fuel injection controller is adapted to determine if a change in engine conditions has occurred, and responsively determine whether a second injection is enabled or disabled for each of the plurality of direct injection devices, at least one data storage from which information may be extracted by the fuel injection controller, the at least one data storage further including at least separate first injection timing information for use when the second fuel injection is enabled and for use when the second fuel injection is disabled, wherein the second fuel injection is enabled or disabled for each of the plurality of direct injection devices over a period of engine operating cycles such that for direct injection devices in which the second fuel injection is enabled the fuel injection controller uses the information that corresponds to first injection timing information of the data storage for use when the second injection is enabled in order to determine first injection timing, and for direct injection devices in which the second injection is disabled the fuel injection controller uses the information that corresponds to first injection timing information of the data storage for use when the second injection is disabled in order to determine first injection timing, wherein:

when enabled, the second fuel injection is added by the fuel injection controller to the fuel injection signal for one direct injection device and corresponding combustion chamber at a time over a predetermined period;

when disabled, the second fuel injection is removed by the fuel injection controller from the fuel injection signal for one direct injection device and corresponding combustion chamber at a time over a predetermined period; and the first injection timing for each of the plurality of direct injection devices and corresponding combustion chambers for each engine operation cycle is determined by the fuel injection controller such that when the second fuel injection is enabled, the corresponding first injection timing corresponds to first injection timing information of the data storage for use when the second fuel injection is enabled, and when the second fuel injection is disabled, the corresponding first injection timing corresponds to first injection timing information of the data storage for use when the second injection is disabled.

3. The direct injection compression ignition internal combustion engine of claim 2, wherein the predetermined period is preferably not less than two seconds and not greater than four seconds.

4. A fuel injection control system of a direct injection compression ignition internal combustion engine operable for partitioning fuel output delivery, comprising:

at least one direct fuel injection device operable to deliver partitioned separate injections of fuel directly into a combustion chamber of the internal combustion engine;

the fuel injection control system being operable on the basis of engine operating parameters to control operation of the at least one direct fuel injection device and to determine the partitioned separate injections of fuel including a pilot injection fuel quantity, a main injection fuel quantity, an anchor injection fuel quantity, a pilot injection timing and duration, a main injection timing and duration, and an anchor injection timing and duration;

the fuel injection control system operable to provide a fuel injection signal including the pilot injection timing and duration, the main injection timing and duration, and the anchor injection timing and duration to the at least one direct fuel injection device to produce the partitioned separate injections of fuel, the fuel injection signal being determined based on predetermined engine operating parameters and information extracted from at least one memory area;

the fuel injection control system further adapted to determine each of the pilot injection fuel quantity, the main injection fuel quantity, and the anchor injection fuel quantity, and then, to determine if a change in engine conditions has occurred, and on the basis of such determination to determine whether the pilot injection is enabled or disabled; and the fuel injection control system being further adapted to dynamically modify the main injection timing at least on the basis of the pilot injection determination.

5. The fuel injection control system of claim 4, further including:

a processor connected with the at least one direct fuel injection device; and the processor adapted to extract information from the at least one look-up map, the at least one look-up map further including at least separate main injection timing information for use when the pilot injection is enabled and disabled, respectively.

6. The fuel injection control system of claim 4, wherein the processor is further adapted to determine if a change in engine conditions has occurred, and on the basis of such determination to determine whether the pilot injection is enabled or disabled; and the processor being further adapted to dynamically modify the main injection timing at least on the basis of the pilot injection determination.

7. The fuel injection control system of claim 6, wherein the engine further includes a plurality of direct injection devices and a plurality of corresponding combustion chambers, and wherein pilot injection is enabled or disabled for each of the plurality of direct injection devices over a period of engine operating cycles such that for direct injection devices in which the pilot fuel injection is enabled the processor uses the information that corresponds to main injection timing information of the at least one look-up map for use when the pilot injection is enabled in order to determine main injection timing, and for direct injection devices in which the pilot injection is disabled the processor uses the information that corresponds to main injection timing information of the at least one look-up map for use when the pilot injection is disabled in order to determine main injection timing.

8. The fuel injection control system of claim 7, wherein:

when enabled, the pilot injection is added by the processor to the fuel injection signal for one direct injection device and corresponding combustion chamber at a time over a predetermined period;

when disabled, the pilot fuel injection is removed by the processor from the fuel injection signal for one direct injection device and corresponding combustion chamber at a time over a predetermined period; and the main injection timing for each of the plurality of direct injection devices and corresponding combustion chambers for each engine operation cycle is determined by the processor such that when the pilot injection is enabled, the corresponding main injection timing corresponds to main injection timing information of the at least one look-up map for use when the pilot injection is enabled, and when the pilot injection is disabled, the corresponding main injection timing corresponds to main injection timing information of the at least one look-up map for use when the pilot injection is disabled.

9. A method for controlling a fuel injection control system of a direct injection internal combustion engine to partition a fuel output delivery of the fuel injection control system to a plurality of direct fuel injection devices such that partitioned separate injections of fuel are delivered directly into corresponding ones of a plurality of combustion chambers of the internal combustion engine comprising the step of:

determining a pilot injection timing and duration, a main injection timing and duration and an anchor injection timing and duration, and a corresponding pilot injection fuel quantity, a main injection fuel quantity, and an anchor injection fuel quantity for each of the plurality of direct injection devices for each engine operation cycle;

then, determining if a change in engine conditions has occurred such that a pilot injection is enabled or disabled for each of the plurality of direct injection devices for each engine operation cycle;

modifying a corresponding main injection timing at least on the basis of the pilot injection determination;

providing a fuel injection signal including the determined pilot injection timing and duration, the determined main injection timing and duration and the determined anchor injection timing and duration to the plurality of direct fuel injection devices;

producing in response to the fuel injection signal the partitioned separate injections of fuel including the determined pilot injection fuel quantity, the main injection fuel quantity, and the anchor injection fuel quantity for each corresponding one of the plurality of combustion chambers for each engine operation cycle.

10. The method for controlling a fuel injection control system of claim 9, further including:

extracting information from at least one data storage including at least one look-up map including at least separate main injection timing information for use when the pilot injection is enabled and disabled, respectively, in order to modify the main injection timing.

11. The method for controlling a fuel injection control system of claim 10, wherein the pilot fuel injection is enabled or disabled for each of the plurality of direct injection devices over a period of engine operating cycles such that for direct injection devices in which the pilot fuel injection is enabled the fuel injection control system uses the information that corresponds to main injection timing information of the data storage for use when the pilot injection is enabled in order to determine main injection timing, and for direct injection devices in which the pilot injection is disabled the fuel injection control system uses the information that corresponds to main injection timing information of the data storage for use when the pilot injection is disabled in order to determine main injection timing.

12. The method for controlling a fuel injection control system of claim 10, further comprising the steps of:

determining whether a pilot injection of fuel is enabled, and when enabled the pilot injection having the duration not equal to zero, and when disabled the pilot injection having the duration equal to zero;

adding the pilot injection to the fuel injection signal for one direct injection device at a time over a predetermined period when the pilot injection is enabled;

removing the pilot injection from the fuel injection signal for one direct injection device at a time over a predetermined period when the pilot injection is disabled; and dynamically modifying the main injection timing for each of the plurality of direct injection devices for each engine operation cycle such that when the pilot injection is enabled, the corresponding main injection timing corresponds to main injection timing information of the data storage for use when the pilot injection is enabled, and when the pilot injection is disabled, the corresponding main injection timing corresponds to main injection timing information of the data storage for use when the pilot injection is disabled.

13. A fuel injection control system of a direct injection compression ignition internal combustion engine operable for partitioning fuel output delivery, comprising:

means for determining a pilot injection timing and duration, a main injection timing and duration and an anchor injection timing and duration, and a corresponding pilot injection fuel quantity, a main injection fuel quantity, and an anchor injection fuel quantity for each of the plurality of direct injection devices for each engine operation cycle;

means for then determining if a change in engine conditions has occurred such that a pilot injection is enabled or disabled for each of the plurality of direct injection devices for each engine operation cycle;

means for modifying a corresponding main injection timing at least on the basis of the pilot injection determination;

means for providing a fuel injection signal including the determined pilot injection timing and duration, the determined main injection timing and duration and the determined anchor injection timing and duration to the plurality of direct fuel injection devices;

means for producing in response to the fuel injection signal the partitioned separate injections of fuel including the determined pilot injection fuel quantity, the main injection fuel quantity, and the anchor injection fuel quantity for each corresponding one of the plurality of combustion chambers for each engine operation cycle.

14. The fuel injection control system of a direct of claim 11, further including:

means for extracting information from at least one data storage including at least one memory area including at least separate main injection timing information for use when the pilot injection is enabled and disabled, respectively, in order to modify the main injection timing.

15. The fuel injection control system of claim 14, wherein the at least one memory area includes at least one look-up map.

16. The fuel injection control system of a direct of claim 14, further comprising:

means for determining whether a pilot injection of fuel is enabled, and when enabled the pilot injection having the duration not equal to zero, and when disabled the pilot injection having the duration equal to zero;

means for adding the pilot injection to the fuel injection signal for one direct injection device at a time over a predetermined period when the pilot injection is enabled;

means for removing the pilot injection from the fuel injection signal for one direct injection device at a time over a predetermined period when the pilot injection is disabled; and means for dynamically modifying the main injection timing for each of the plurality of direct injection devices for each engine operation cycle such that when the pilot injection is enabled, the corresponding main injection timing corresponds to main injection timing information of the data storage for use when the pilot injection is enabled, and when the pilot injection is disabled, the corresponding main injection timing corresponds to main injection timing information of the data storage for use when the pilot injection is disabled.

17. A direct injection compression ignition internal combustion engine including a plurality of combustion chambers, comprising:

a plurality of direct fuel injection devices operable to deliver partitioned separate injections of fuel directly into a corresponding one of the plurality of combustion chambers;

a fuel injection control system;

the fuel injection control system including a processor connected with the plurality of direct fuel injection devices;

the processor including at least one data storage;

the data storage further including at least one look-up map;

the processor, operable on the basis of engine operating parameters to control operation of the plurality of direct fuel injection devices, and to determine the partitioned separate injections of fuel including a pilot injection fuel quantity, a main injection fuel quantity, an anchor injection fuel quantity, a pilot injection timing and duration, a main injection timing and duration, and an anchor injection timing and duration;

the processor further operable to provide a fuel injection signal including the pilot injection timing and duration, the main injection timing and duration, and the anchor injection timing and duration to at least one of the plurality of direct fuel injection devices to produce the partitioned separate injections of fuel, the fuel injection signal being determined based on predetermined engine operating parameters and information extracted from the at least one look-up map;

the processor further adapted to determine each of the pilot injection fuel quantity, the main injection fuel quantity, and the anchor injection fuel quantity, and then, to determine if a change in engine conditions has occurred, and on the basis of such determination to determine whether the pilot injection is enabled or disabled; and the processor being further adapted to dynamically modify the main injection timing at least on the basis of the pilot injection determination.

* * * * *